Figure 1:
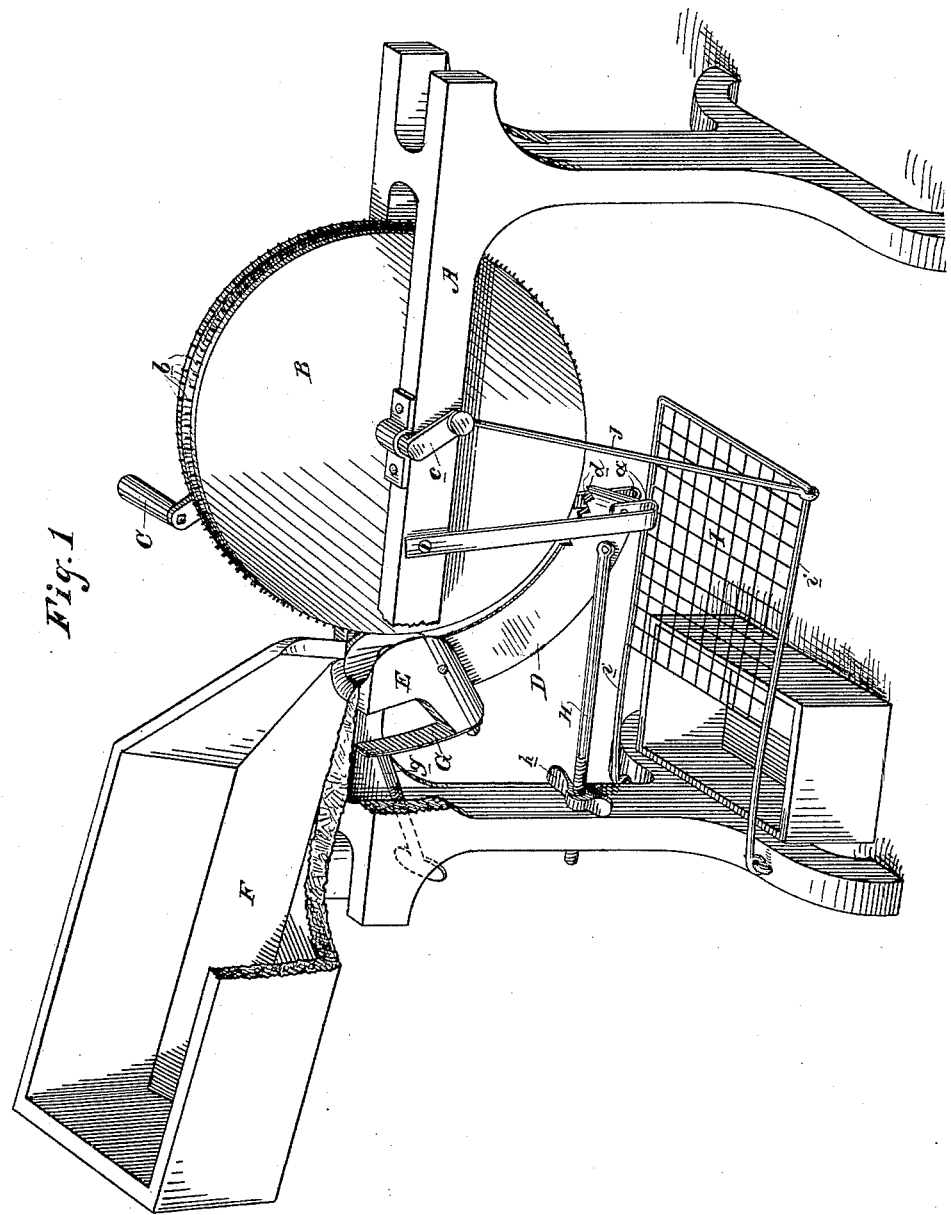

(No Model.) 2 Sheets—Sheet 1.

L. SANGUINETTI & W. STEVENSON.
FRUIT CUTTING AND PITTING MACHINE.

No. 417,885. Patented Dec. 24, 1889.

Witnesses,
Geo. H. Strong.

Inventors,
Luke Sanguinetti
William Stevenson
By Dewey & Co.
Atty

N. PETERS, Photo-Lithographer, Washington, D. C.

(No Model.) 2 Sheets—Sheet 2.
L. SANGUINETTI & W. STEVENSON.
FRUIT CUTTING AND PITTING MACHINE.
No. 417,885. Patented Dec. 24, 1889.
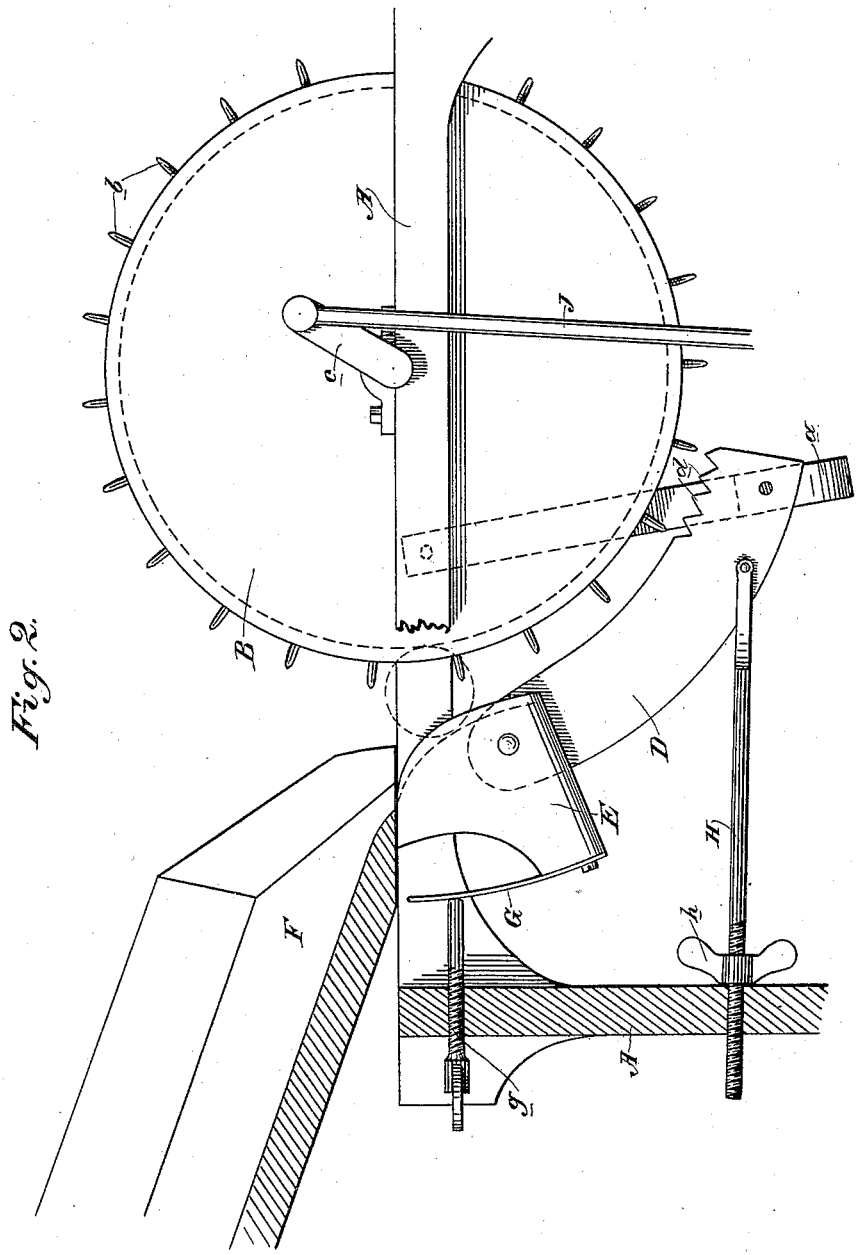

UNITED STATES PATENT OFFICE.

LUKE SANGUINETTI, OF VALLECITO, AND WILLIAM STEVENSON, OF DOUGLAS FLAT, CALIFORNIA.

FRUIT CUTTING AND PITTING MACHINE.

SPECIFICATION forming part of Letters Patent No. 417,885, dated December 24, 1889.

Application filed May 23, 1889. Serial No. 311,869. (No model.)

*To all whom it may concern:*

Be it known that we, LUKE SANGUINETTI, of Vallecito, and WILLIAM STEVENSON, of Douglas Flat, Calaveras county, State of California, have invented an Improvement in Fruit Cutting and Pitting Machines; and we hereby declare the following to be a full, clear, and exact description of the same.

Our invention relates to the class of machines for cutting fruit and removing the stones therefrom; and our invention consists in a curved knife for cutting the fruit and provided with teeth for engaging the pit or stone, a rotary feed-wheel provided with pins or points for engaging the fruit and carrying it down upon the curved knife, a hopper for directing the fruit to the wheel, a feed-block for controlling the feed of the fruit, and a vibrating screen for separating the pits from the cut fruit, all of which, together with details of construction, arrangement, and adjustment of the several parts, we shall hereinafter fully describe.

The object of our invention is to provide a simple and effective fruit cutting and pitting machine.

Referring to the accompanying drawings for a more complete explanation of our invention, Figure 1 is a perspective view of our machine, one side of the supply-hopper being broken away. Fig. 2 is a side elevation showing the relative position of the adjacent edges and surfaces of the working parts, the screen I being omitted.

A is the frame of our machine.

B is the feed-wheel mounted upon the frame and provided with a crank C or other device for imparting rotation to it. The face of the wheel is grooved, as shown, and on each side of the groove are located the radially-projecting pins or points $b$.

D is a curved knife, which is mounted under the wheel at about its second quarter and in the plane of its rotation, and has a curvature conforming substantially to that of the wheel. This knife is supported by means of bracket-arms $a$, extending downwardly from the edges of the frame and pivoted to the lower end of the knife. The upper end of the knife has connected with it a feed-block E, the face of which is grooved and is opposite to the grooved face of the wheel, leaving between the two faces a passage for the fruit down onto the upper or cutting edge of the knife.

F is a supply-hopper secured to one end of the frame A and having its exit-opening in communication with the feed-space between the block E and the periphery of the wheel B. A spring G is secured to the back of the block and extends upwardly, and has bearing against its upper end a set-screw $g$, which regulates the tension of the spring and holds and returns the feed-block to proper position, thus controlling it.

H is a screw-bolt, one end of which is pivoted to the lower end of the knife and the other end passes through one of the legs of the frame, being provided with a set-nut $h$, by which its position is defined and regulated. This screw-bolt is for the purpose of primarily adjusting the knife and holding it in position, though it does not interfere with the regulating movement of the feed-block E, attached to the top of the knife, because said bolt's connection with the knife is a pivotal one, which allows the backward and forward movement of the feed-block and its control by the spring G. The lower end of the knife is connected with its supporting-bracket $a$ by a pivotal connection, so that the whole knife may yield to conform itself to the different sizes of fruit and pits. The lower upper edge of the knife is provided with teeth $d$, for the purpose of engaging the pit of the fruit.

I is a screen, the arms $i$ of which are pivoted to one leg of the frame A, and said screen is suspended at its other end by means of the connecting rod or link J, the upper end of which is attached to the crank $c$ on the other end of the pivotal or central shaft of the feed-wheel B.

The operation of the machine is as follows: The fruit is deposited in the supply-hopper, and thence passes, one at a time, into the opening between the feed-block E and the periphery of the wheel B. The feed-block yields backwardly sufficiently to admit the different sizes of fruit, and by means of its controlling-spring G keeps each fruit to its place, so that the pins or points $b$ of the wheel engage the flesh of the fruit, carrying it down with it by its rotation and forcing it upon the cutting-edge of the knife D, thereby effecting its division into halves. The knife itself yields to conform to different sizes of fruit and pits, and as the fruit reaches the toothed edge of the knife the teeth engage the pit and have a tendency to more completely separate it from the flesh. The halved fruit and the disengaged pit or stone drop down upon the screen I, which by means of its connections has a vertically-vibrating movement, thus separating the pits from the fruit, the former dropping through the meshes of the screen, while the latter roll off its inner edge into a suitable receptacle below.

Having thus described our invention, what we claim as new, and desire to secure by Letters Patent, is—

1. In a fruit cutting and pitting machine, the combination of a rotary wheel for feeding the fruit and a knife arranged below the wheel in the plane of its rotation and having a curvature substantially corresponding to that of the wheel, whereby the fruit is carried by the rotation of the wheel upon the knife and cut, substantially as described.

2. In a fruit cutting and pitting machine, the combination of a rotary wheel having pins or points projecting from its face for engaging the fruit and a curved knife arranged below the wheel and in the plane of rotation thereof, whereby the fruit is carried down upon and cut by the knife, substantially as described.

3. In a fruit cutting and pitting machine, the combination of a rotary wheel and a knife arranged below the horizontal central plane of the said wheel and in the plane of rotation thereof, said knife being curved to conform substantially to the curvature of the wheel and having in its top edge a series of teeth for engaging the pit of the fruit, substantially as described.

4. In a fruit cutting and pitting machine, the combination of the rotary wheel, having a grooved face with projecting pins or points for engaging the fruit, and a curved knife below the wheel and in the plane of rotation thereof, said knife being provided with teeth on its upper edge for engaging the pit of the fruit, substantially as described.

5. In a fruit cutting and pitting machine, the combination of a rotary wheel for feeding the fruit downwardly, a curved knife below the wheel and in the plane of rotation thereof for cutting the fruit, and a feed-block at the upper end of the knife and opposing the face of the wheel, substantially as described.

6. In a fruit cutting and pitting machine, the combination of the rotary wheel for feeding the fruit down, a curved knife below said wheel and in the plane of rotation thereof, a feed-block secured to the top of the knife and opposing the face of the wheel, and a supply-hopper for directing the fruit between the feed-block and the face of the wheel, substantially as described.

7. In a fruit cutting and pitting machine, the combination of the rotary feed-wheel, the pivotally-supported curved knife in the plane of rotation of said wheel, a feed-block secured to the top of the knife and opposing the face of the wheel, the spring and adjusting-screw for controlling the feed-block, and the supply-hopper for directing the fruit between the said block and the face of the wheel, substantially as described.

8. In a fruit cutting and pitting machine, the combination of the rotary feed-wheel, the pivotally-supported curved knife below said wheel and in the plane of its rotation, the feed-block secured to the top of the knife and opposing the face of the wheel, a supply-hopper for directing the fruit between the block and the feed-wheel, the spring and set-screw for controlling the feed-block, and the screw-bolt and set-nut for adjusting the curved knife, substantially as described.

9. In a fruit cutting and pitting machine, the combination of the rotary feed-wheel, the curved knife below, the feed-block, the supply-hopper, and the vertically-vibrating screen below the wheel and knife for receiving the cut fruit and the pits and separating them, substantially as described.

10. In a fruit cutting and pitting machine, the combination of the rotary feed-wheel, the curved knife below the feed-wheel, the feed-block and the supply-hopper, the pivoted screen below the wheel and knife, and the means for vibrating said screen, consisting of the crank on the shaft of the wheel and the connecting-rod between said crank and screen, substantially as described.

11. A fruit cutting and pitting machine comprising the combination of the frame, the rotary wheel mounted thereon and having the grooved face with the projecting pins or points, the pivotally-supported curved knife below the wheel and having teeth upon its upper edge, the screw-bolt and set-nut for adjusting the knife, the feed-block at the head of the knife, and the spring and set-screw for adjusting said block, the supply-hopper for directing the fruit between the block and the face of the wheel, the pivoted screen below the wheel and knife for receiving the cut fruit and pits and separating them, and the crank and connecting-rod for vibrating the screen, substantially as described.

In witness whereof we have hereunto set our hands.

LUKE SANGUINETTI.
WILLIAM STEVENSON.

Witnesses:
C. SUTTON,
E. F. FLOYD.